(12) United States Patent
Shin et al.

(10) Patent No.: US 11,962,020 B2
(45) Date of Patent: Apr. 16, 2024

(54) BATTERY CELL, AND BATTERY MODULE, BATTERY RACK AND ENERGY STORAGE SYSTEM INCLUDING THE SAME

(71) Applicant: LG CHEM, LTD., Seoul (KR)

(72) Inventors: Eun-Gyu Shin, Daejeon (KR); Jae-Min Yoo, Daejeon (KR); Yoon-Koo Lee, Daejeon (KR); Dal-Mo Kang, Daejeon (KR); Jeong-O Mun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 122 days.

(21) Appl. No.: 16/979,600

(22) PCT Filed: Jan. 20, 2020

(86) PCT No.: PCT/KR2020/000959
§ 371 (c)(1),
(2) Date: Sep. 10, 2020

(87) PCT Pub. No.: WO2020/171392
PCT Pub. Date: Aug. 27, 2020

(65) Prior Publication Data
US 2021/0043910 A1 Feb. 11, 2021

(30) Foreign Application Priority Data
Feb. 18, 2019 (KR) .................. 10-2019-0018662

(51) Int. Cl.
*H01M 10/00* (2006.01)
*H01M 10/058* (2010.01)
(Continued)

(52) U.S. Cl.
CPC ....... *H01M 50/124* (2021.01); *H01M 10/058* (2013.01); *H01M 50/105* (2021.01);
(Continued)

(58) Field of Classification Search
CPC ............ H01M 50/531; H01M 10/058; H01M 50/124; H01M 50/136; H01M 50/202;
(Continued)

(56) References Cited

U.S. PATENT DOCUMENTS 6,358,644 B1 3/2002 Shibata et al.
2006/0222937 A1* 10/2006 Morimoto ........... H01M 50/528
429/130

(Continued)

FOREIGN PATENT DOCUMENTS

CN 107615515 A 1/2018
JP 2000-138040 A 5/2000
(Continued)

OTHER PUBLICATIONS

Extended European Search Report for European Application No. 20759125.6, dated Jun. 28, 2021.
(Continued)

*Primary Examiner* — Nicholas P D'Aniello
(74) *Attorney, Agent, or Firm* — Birch, Stewart, Kolasch & Birch, LLP (57) ABSTRACT

A battery cell includes an electrode assembly, a pair of electrode leads electrically connected to the electrode assembly, a battery case configured to accommodate the pair of electrode leads such that the pair of electrode leads protrude at least partially in a front and rear direction of the battery cell, the battery case having an accommodation space formed to accommodate the electrode assembly, and a taping unit configured to integrally cover both side surfaces and upper and lower surfaces of the battery case.

13 Claims, 10 Drawing Sheets

(51) Int. Cl.
  *H01M 50/105* (2021.01)
  *H01M 50/124* (2021.01)
  *H01M 50/211* (2021.01)
  *H01M 50/24* (2021.01)
  *H01M 50/531* (2021.01)
  *H01M 50/548* (2021.01)

(52) U.S. Cl.
  CPC ......... *H01M 50/211* (2021.01); *H01M 50/24* (2021.01); *H01M 50/531* (2021.01); *H01M 50/548* (2021.01)

(58) Field of Classification Search
  CPC .. H01M 50/204; H01M 50/24; H01M 50/543; H01M 50/548; H01M 50/116; H01M 50/20; H01M 2220/10; Y02P 70/50; Y02E 60/10
  See application file for complete search history.

(56) References Cited

U.S. PATENT DOCUMENTS

| | | | | |
|---|---|---|---|---|
| 2007/0128513 | A1* | 6/2007 | Hatta | H01M 50/121 |
| | | | | 429/185 |
| 2007/0154794 | A1* | 7/2007 | Kim | H01M 10/0436 |
| | | | | 429/185 |
| 2007/0202398 | A1 | 8/2007 | Kim | |
| 2009/0098416 | A1 | 4/2009 | Hatta et al. | |
| 2009/0297936 | A1* | 12/2009 | Nemoto | H01M 50/227 |
| | | | | 429/152 |
| 2010/0209768 | A1 | 8/2010 | Ahn et al. | |
| 2012/0219847 | A1* | 8/2012 | Hong | H01M 50/103 |
| | | | | 29/623.2 |
| 2013/0280585 | A1 | 10/2013 | Morisaki et al. | |
| 2014/0017551 | A1 | 1/2014 | Suzuki | |
| 2016/0301045 | A1 | 10/2016 | Tyler et al. | |
| 2017/0194606 | A1* | 7/2017 | Lim | H01M 50/548 |
| 2018/0108881 | A1 | 4/2018 | Jin et al. | |
| 2018/0215490 | A1 | 8/2018 | Choi | |
| 2021/0043910 | A1* | 2/2021 | Shin | H01M 50/116 |

FOREIGN PATENT DOCUMENTS

| | | |
|---|---|---|
| JP | 2012-94535 A | 5/2012 |
| JP | 2012-212608 A | 11/2012 |
| JP | 2013-222655 A | 10/2013 |
| KR | 10-2005-0000725 A | 1/2005 |
| KR | 10-2007-0071251 A | 7/2007 |
| KR | 10-2012-0097312 A | 3/2012 |
| KR | 10-2013-0123752 A | 11/2013 |
| KR | 10-2014-0061084 A | 5/2014 |
| KR | 10-2014-0114688 A | 9/2014 |
| KR | 10-2015-0036926 A | 4/2015 |
| KR | 10-2016-0128835 A | 11/2016 |
| KR | 10-2018-0089014 A | 8/2018 |

OTHER PUBLICATIONS

International Search Report (PCT/ISA/210) issued in PCT/KR2020/000959 dated Apr. 29, 2020.

* cited by examiner

BATTERY CELL, AND BATTERY MODULE, BATTERY RACK AND ENERGY STORAGE SYSTEM INCLUDING THE SAME

TECHNICAL FIELD

The present disclosure relates to a battery cell, and a battery module, a battery rack and an energy storage system including the battery cell.

The present application claims priority to Korean Patent Application No. 10-2019-0018662 filed on Feb. 18, 2019 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack by using at least one battery module and adding other components. Here, according to various voltage and capacity requirements, an energy storage system may be configured to include battery racks, each having at least one battery module.

When configuring a battery module, a battery rack and an energy storage system, in the conventional art, a plurality of battery cells are mounted to a plurality of individual or separate cell cartridges, and then the plurality of cell cartridges are stacked to configure a battery module, a battery rack or an energy storage system.

Accordingly, conventionally, when stacking a plurality of battery cells, a plurality of separate cell cartridges are additionally required, which are disadvantages in terms of slimming and energy density due to the plurality of cell cartridges. In addition, the addition of the plurality of separate cell cartridges has a problem of deteriorating the overall assembly process efficiency in terms of cost or time.

Therefore, it is demanded to find a method for providing a battery cell that may improve the assembly process efficiency while being slimmer and more compact, and a battery module, a battery rack and an energy storage system including the battery cell.

DISCLOSURE

Technical Problem

The present disclosure is directed to providing a battery cell having a smaller and more compact structure, and a battery module, a battery rack and an energy storage system including the battery cell.

In addition, the present disclosure is also directed to providing a battery cell that may improve the assembly process efficiency, and a battery module, a battery rack and an energy storage system including the battery cell.

Moreover, the present disclosure is also directed to providing a battery cell that may ensure fixation and insulation performance of the battery cell with a simple structure, and a battery module, a battery rack and an energy storage system including the battery cell.

Technical Solution

In one aspect of the present disclosure, there is provided a battery cell, comprising: an electrode assembly; a pair of electrode leads electrically connected to the electrode assembly; a battery case configured to accommodate the pair of electrode leads such that the pair of electrode leads protrude at least partially in a front and rear direction of the battery cell, the battery case having an accommodation space formed to accommodate the electrode assembly; and a tape configured to integrally cover side surfaces, upper surface and the lower surface of the battery case.

The tape may include a main tape integrally attached to the side surfaces, the upper surface and the lower surface of the battery case; and a pair of auxiliary tapes attached to the main tape and arranged to face the upper surface and the lower surface of the battery case with the main tape being interposed therebetween when the main tape is attached to the battery case.

A wing folding portion that is folded at least once may be provided to the upper surface and the lower surface of the battery case, and the tape may be attached to the wing folding portion.

The tape may be attached to at least one surface among the side surfaces, the upper surface and the lower surface of the battery case and then attached to the side surfaces, the upper surface and the lower surface of the battery case by rotating at least one of the battery case and the tape.

The main tape may be a double-sided tape.

The pair auxiliary tapes may be insulating tapes.

In addition, the present disclosure further provides a battery module, comprising: a plurality of battery cells according to the above embodiments; and a module case configured to accommodate the plurality of battery cells.

The plurality of battery cells may be stacked on each other such that the side surfaces of the battery cells face each other inside the module case, and when the plurality of battery cells are stacked, the tape of a first battery cell may be adhered to the tape of a second battery cell so that the plurality of battery cells are fixed to each other inside the module case.

Moreover, the present disclosure further provides a battery rack, comprising: at least one battery module according to the above embodiments; and a rack case configured to accommodate the at least one battery module.

In addition, the present disclosure further provides an energy storage system, comprising at least one battery rack according to the above embodiments.

Advantageous Effects

According to various embodiments as above, it is possible to provide a battery cell having a smaller and more compact structure, and a battery module, a battery rack and an energy storage system including the battery cell.

In addition, according to various embodiments as above, it is possible to provide a battery cell that may improve the assembly process efficiency, and a battery module, a battery rack and an energy storage system including the battery cell.

Moreover, according to various embodiments as above, it is possible to provide a battery cell that may ensure fixation and insulation performance of the battery cell with a simple structure, and a battery module, a battery rack and an energy storage system including the battery cell.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
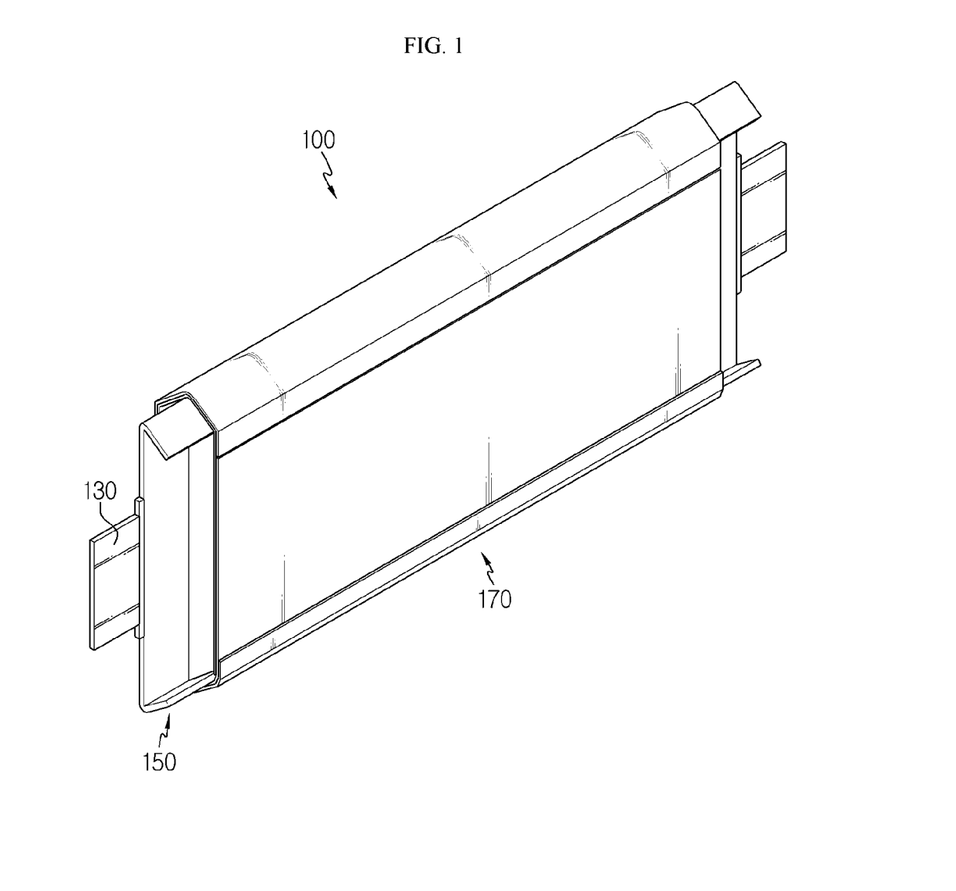
FIG. 1 is a diagram for illustrating a battery cell according to an embodiment of the present disclosure.
Figure 2:
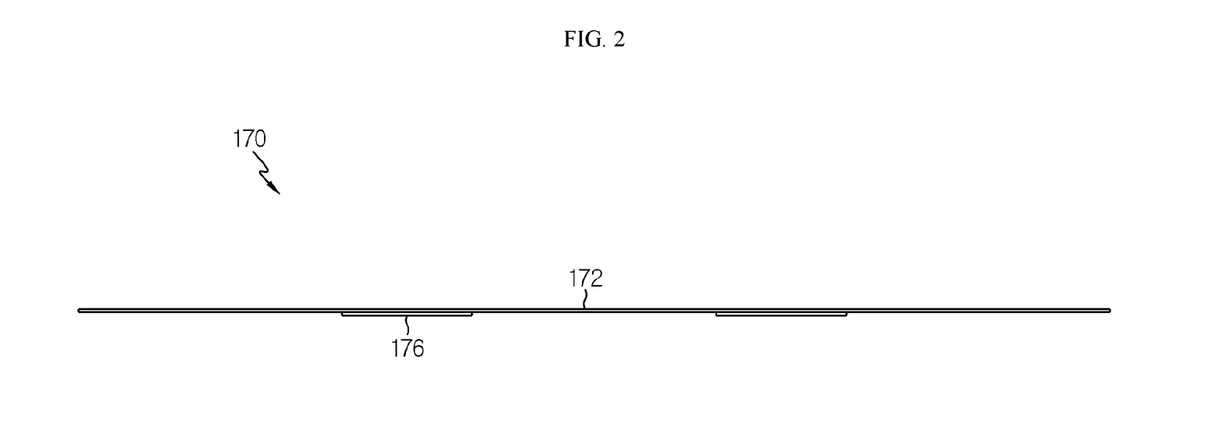
FIG. 2 is a diagram for illustrating a taping unit of the battery cell of FIG. 1.
Figure 3:
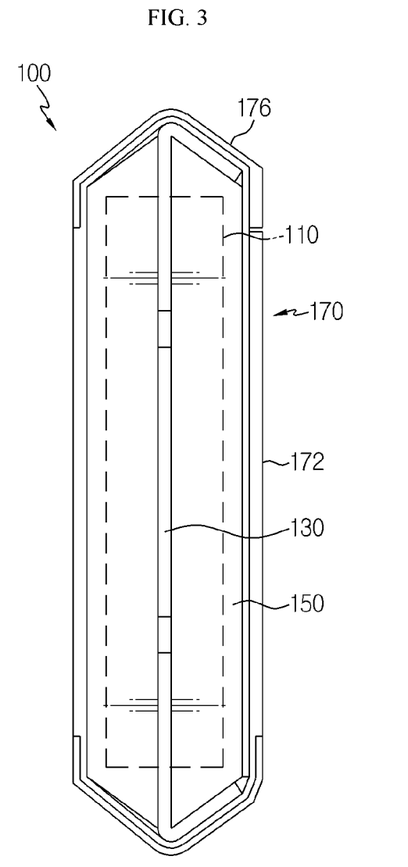
FIG. 3 is a front view showing the battery cell of FIG. 1.
Figure 4:
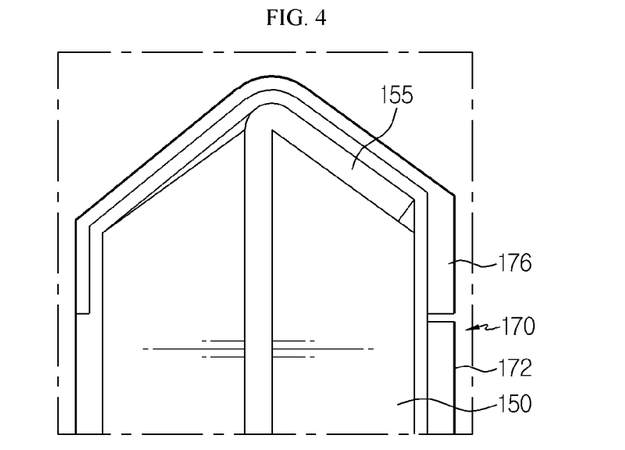
FIG. 4 is an enlarged view showing a main part of the battery cell of FIG. 3.
Figure 5:
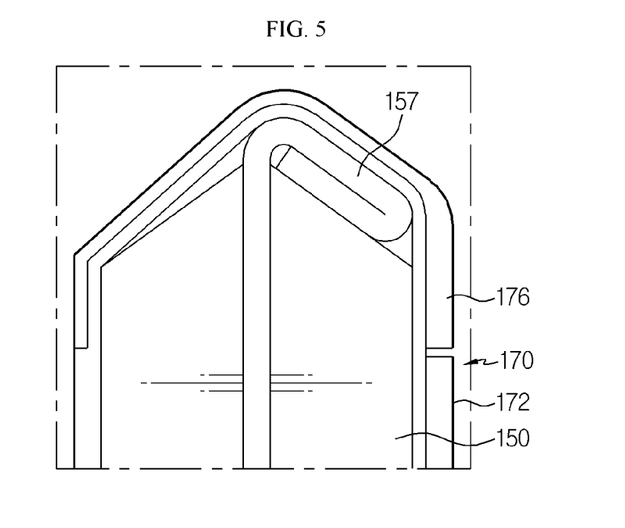
FIG. 5 is a diagram for illustrating a wing folding portion according to another embodiment of the battery cell of FIG. 3.

FIG. 1 is a diagram for illustrating a battery cell according to an embodiment of the present disclosure, FIG. 2 is a diagram for illustrating a taping unit of the battery cell of FIG. 1, FIG. 3 is a front view showing the battery cell of FIG. 1, FIG. 4 is an enlarged view showing a main part of the battery cell of FIG. 3, and FIG. 5 is a diagram for illustrating a wing folding portion according to another embodiment of the battery cell of FIG. 3.

Referring to FIGS. 1 to 5, the battery cell 100 is a secondary battery and may be provided as any one of a pouch-type secondary battery, a rectangular secondary battery and a cylindrical secondary battery. Hereinafter, in this embodiment, the battery cell 100 is described as a pouch-type secondary battery.

The battery cell 100 may include an electrode assembly, a pair of electrode leads 130, a battery case 150 and a taping unit 170.

The electrode assembly may include a positive electrode plate, a negative electrode plate, and a separator. The electrode assembly is well known in the art and thus will not be described in detail.

The pair of electrode leads 130 are electrically connected to the electrode assembly and may protrude out of a side of the battery case 150, explained later. The pair of electrode leads 130 may include a positive electrode lead and a negative electrode lead.

The battery case 150 accommodates the pair of electrode leads 130 such that the pair of electrode leads 130 protrude at least partially in a front and rear direction (see FIG. 1) of the battery cell 100, and may have an accommodation space formed to accommodate the electrode assembly.

Upper and lower surfaces of the battery case 150 may include wing folding portions 155, 157 that are folded at least once to improve slimness, energy density and sealing force of the battery cell 100. As an example, as shown in FIG. 4, the wing folding portion 155 may be provided to be folded once. Alternatively, as shown in FIG. 5, the wing folding portion 157 may be provided to be folded twice.

The taping unit 170 is for fixing and supporting adjacent battery cells 100 to each other when a plurality of battery cells 100 are stacked on each other, and may integrally cover both side surfaces (see FIG. 1) and the upper and lower surfaces (see FIG. 1) of the battery case 150.

The taping unit 170 may include a main tape 172 and an auxiliary tape 176.

The main tape 172 may be integrally attached to both side surfaces and the upper and lower surfaces of the battery case 150. When being attached to the upper and lower surfaces of the battery case 150, the main tape 172 may be attached to the wing folding portions 155, 157 of the battery case 150. The main tape 172 may be provided in a predetermined length to entirely cover both the side surfaces and the upper and lower surfaces of the battery case 150.

The main tape 172 may be provided as a double-sided tape for adhesion to adjacent battery cells 100 when the battery case 150 and the plurality of battery cells 100 are stacked on each other.

The main tape 172 may be attached to at least one surface among both side surfaces and the upper and lower surfaces of the battery case 150, and then attached to both side surfaces and the upper and lower surfaces of the battery case 150 by rotating at least one of the battery case 150 and the taping unit 170.

The auxiliary tape 176 may be provided in a pair. The pair of auxiliary tapes 176 are attached to the main tape 172, and when the main tape 172 is attached to the battery case 150, the pair of auxiliary tapes 176 may be attached to face the upper and lower surfaces of the battery case 150 with the main tape 172 being interposed therebetween.

The pair of auxiliary tapes 176 may be provided as insulating tapes to ensure insulation between the plurality of battery cells 100 and the module case 200, explained later, when configuring the battery module 10, explained later, including the plurality of battery cells 100.

When the taping unit 170 is attached to the battery cell 100, the pair of auxiliary tapes 176 may be disposed to surround the upper and lower surfaces of the battery case 150. Accordingly, when the battery cell 100 swells, the pair of auxiliary tapes 176 may prevent the battery cell 100 from expanding.

Moreover, when configuring the battery module 10 including the battery cell 100, the pair of auxiliary tapes 176 form a partition structure between the battery case 150 and electric components near the wing folding portion 155, 157 of the battery case 150, and thus may prevent the cooling performance of the battery cell 100 from deteriorating.

Hereinafter, a process of attaching and fixing the taping unit 170 to the battery cell 100 according to this embodiment will be described in more detail.

FIGS. 6 to 10 are diagrams for illustrating a process of attaching the taping unit of the battery cell of FIG. 1.

Figure 6:
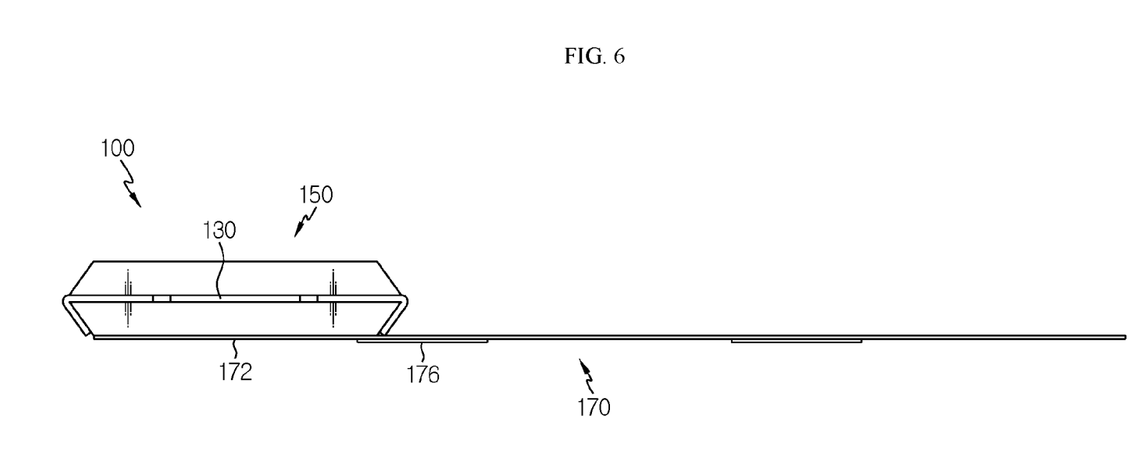
FIGS. 6 to 10 are diagrams for illustrating a process of attaching the taping unit of the battery cell of FIG. 1.

Referring to FIG. 6, a manufacturer or the like may attach one end of the main tape 172 of the taping unit 170 to one side of the battery case 150 of the battery cell 100.

Figure 7:
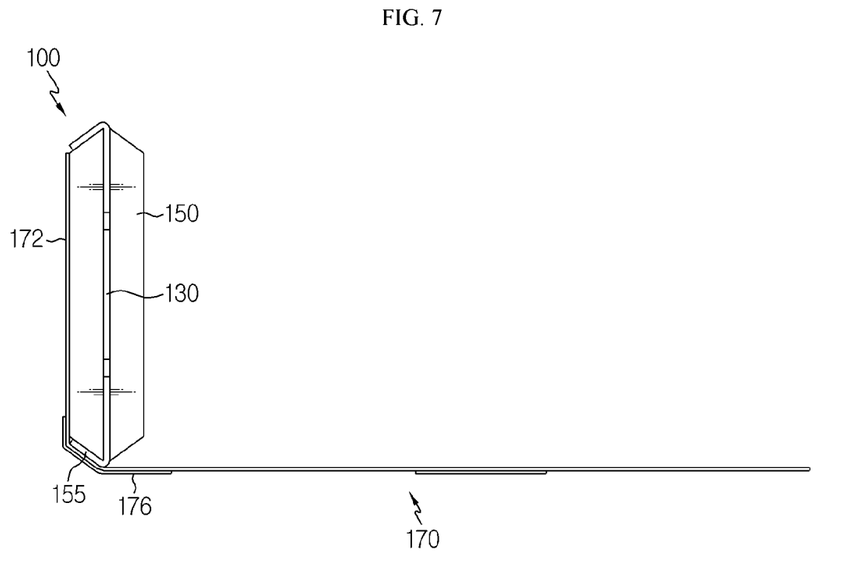

Referring to FIG. 7, the manufacturer or the like may rotate the battery cell 100 by 90 degrees in one direction to attach the main tape 172 of the taping unit 170 to any one wing folding portion 155 of the battery case 150 of the battery cell 100. Accordingly, the auxiliary tape 176 of the taping unit 170 may cover one wing folding portion 155 of the battery case 150 of the battery cell 100.

Figure 8:
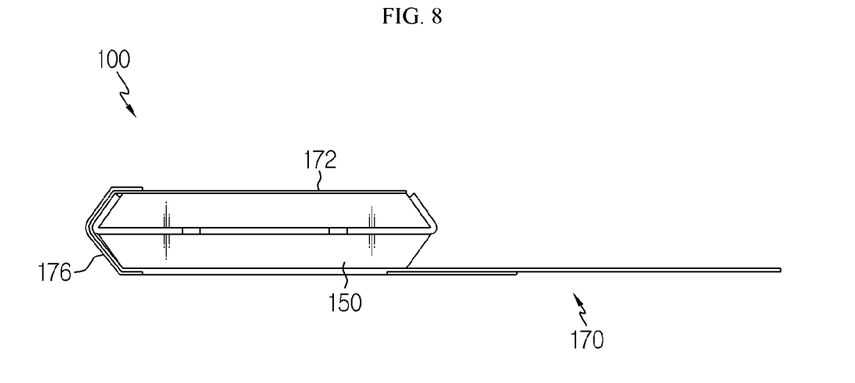

Referring to FIG. 8, after that, the manufacturer or the like may rotate the battery cell 100 again by 90 degrees in the one direction to attach the main tape 172 of the taping unit 170 to the other side of the battery case 150 of the battery cell 100.

Figure 9:
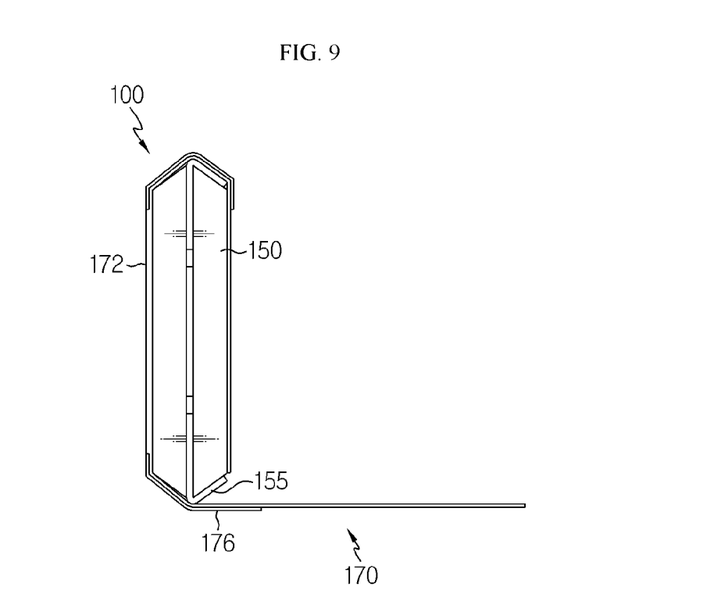

Referring to FIG. 9, after that, the manufacturer or the like may rotate the battery cell 100 again by 90 degrees in one direction to attach the main tape 172 of the taping unit 170 to the other wing folding portion 155 of the battery case 150 of the battery cell 100. Accordingly, the auxiliary tape 176 of the taping unit 170 may cover the other wing folding portion 155 of the battery case 150 of the battery cell 100.

Figure 10:
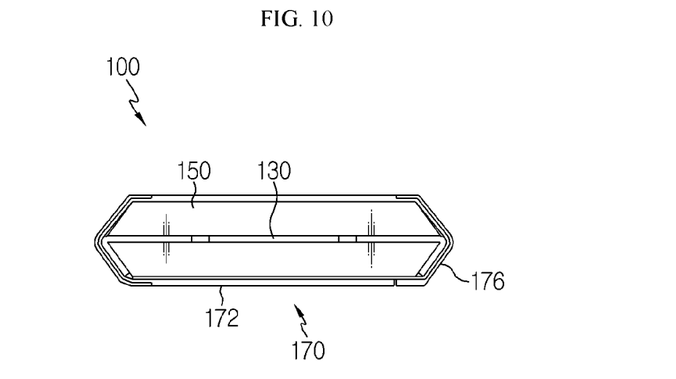

Referring to FIG. 10, after that, the manufacturer or the like may rotate the battery cell 100 again by 90 degrees in the one direction to attach the main tape 172 of the taping unit 170 to one side of the battery case 150 of the battery cell 100.

Through this attaching and fixing process, the taping unit 170 may be integrally attached to both side surfaces and the upper and lower surfaces of the battery case 100 to entirely cover both side surfaces and upper and lower surfaces of the battery case 150 of the battery cell 100.

Figure 11:
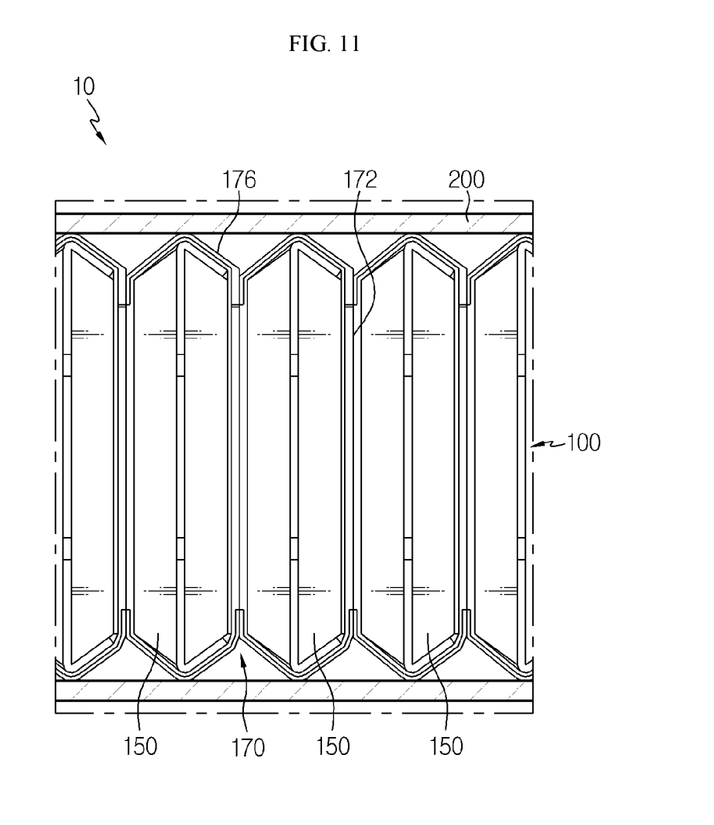
FIG. 11 is a diagram for illustrating a battery module according to an embodiment of the present disclosure.

FIG. 11 is a diagram for illustrating a battery module according to an embodiment of the present disclosure.

Referring to FIG. 11, the battery module 10 may include a plurality of the battery cell 100 and a module case 200 configured to accommodate the plurality of battery cells 100.

The plurality of battery cells 100 may be stacked on each other such that both side surfaces of the battery cells 100 face each other inside the module case 200. When the plurality of battery cells 100 are stacked, the taping unit 170 may be adhered to a taping unit 170 of a facing battery cell 100 such that the plurality of battery cells 100 are fixed to each other inside the module case 200.

In this embodiment, when the battery cells 100 are stacked, the battery cells 100 are fixed to each other using the taping unit 170 provided to the battery cells 100, and thus it is possible not to use a plurality of separate cell cartridges, different from the prior art.

Accordingly, in this embodiment, it is possible to secure a space as much as the volume occupied by a plurality of conventional cell cartridges inside the module case 200, thereby significantly improving the slimming and energy density of the battery module 10.

Moreover, in this embodiment, since a plurality of separate cell cartridges are omitted, it is possible to reduce manufacturing cost or manufacturing time caused by adding a plurality of separate cell cartridges, thereby significantly improving the overall assembly process efficiency of the battery module 10.

Figure 12:
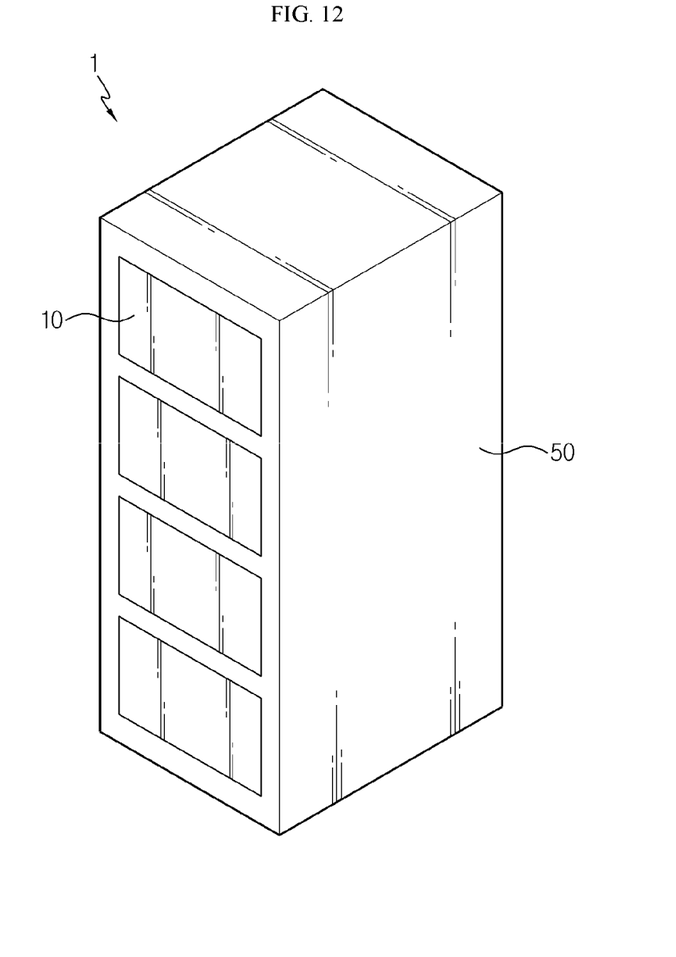
FIG. 12 is a diagram for illustrating a battery rack according to an embodiment of the present disclosure.

FIG. 12 is a diagram for illustrating a battery rack according to an embodiment of the present disclosure.

Referring to FIG. 12, a battery rack 1 may include at least one battery module 10 and a rack case 50 configured to accommodate the at least one battery module 10.

Since the battery rack 1 of this embodiment includes the battery cells 100 and the battery module 10 of the former embodiments, the battery rack 1 may be implemented to have all advantages of the battery cells 100 and the battery module 10 of the former embodiments.

Figure 13:
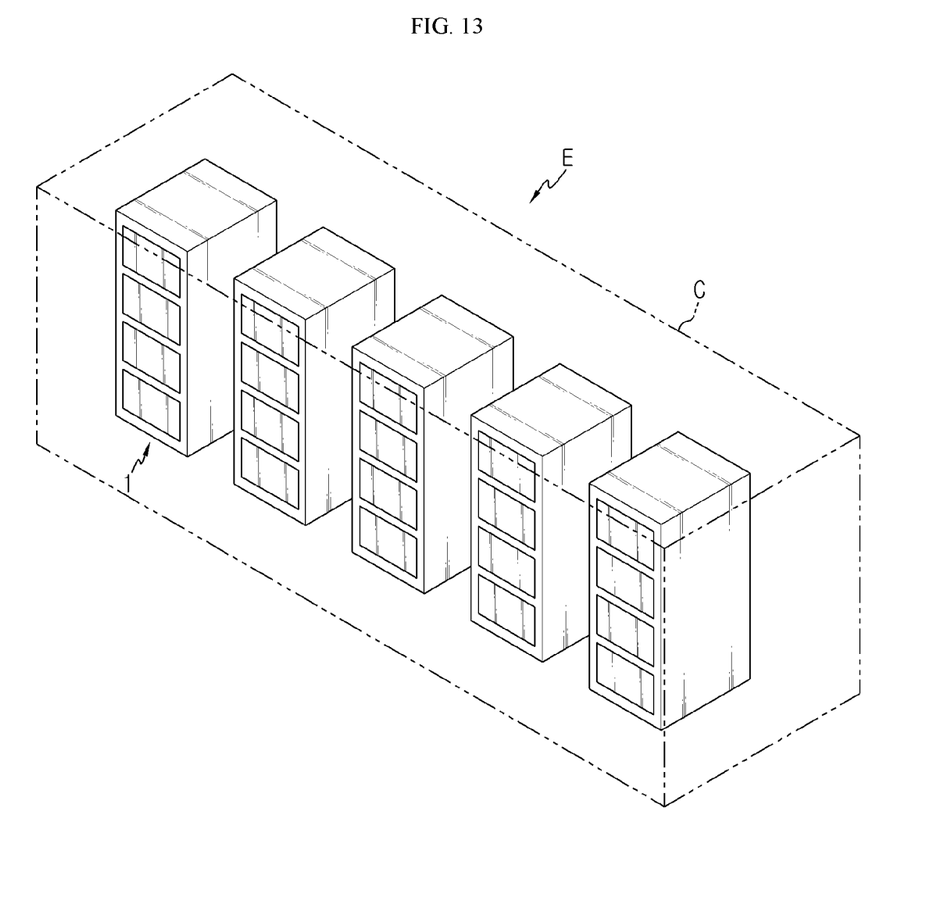
FIG. 13 is a diagram for illustrating an energy storage system according to an embodiment of the present disclosure.

FIG. 13 is a diagram for illustrating an energy storage system according to an embodiment of the present disclosure.

Referring to FIG. 13, an energy storage system E may be used as a household or industrial energy source, and may include at least one battery rack 1 and a rack case C configured to accommodate the at least one battery rack 1.

Since the energy storage system E of this embodiment includes the battery cells 100, the battery module 10 and the battery rack 1 of the former embodiments, the energy storage system E may be implemented to have all advantages of the battery cells 100, the battery module 10 and the battery rack 1 of the former embodiments.

According to various embodiments as above, it is possible to provide the battery cell 100 having a smaller and more compact structure, and the battery module 10, the battery rack 1 and the energy storage system E including the battery cell 100.

In addition, according to various embodiments as above, it is possible to provide the battery cell 100 that may improve the assembly process efficiency, and the battery module 10, the battery rack 1 and the energy storage system E including the battery cell 100.

Moreover, according to various embodiments as above, it is possible to provide the battery cell 100 that may ensure fixation and insulation performance of the battery cell 100 with a simple structure, and the battery module 10, the battery rack 1 and the energy storage system E including the battery cell 100.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:
1. A battery cell, comprising:
an electrode assembly;
a pair of electrode leads electrically connected to the electrode assembly;
a battery case configured to accommodate the pair of electrode leads, the battery case having a pair of end surfaces, a pair of side surfaces, an upper surface and a lower surface, the battery case having an accommodation space formed to accommodate the electrode assembly, the pair of electrode leads protruding from a respective one of the pair of end surfaces, the distance between the end surfaces defining a width of the battery cell;
a tape configured to integrally cover the pair of side surfaces, the upper surface and the lower surface of the battery case, the tape extending over an entire length of the upper surface and an entire length of at least one of the pair of side surfaces, wherein the tape comprises:
a main tape attached to the pair of side surfaces, the upper surface and the lower surface of the battery case, the main tape having a first end and a second end spaced from the first end, a bottom surface contacting the battery case and a top surface opposite the bottom surface; and
a pair of auxiliary tapes attached to the top surface of the main tape, the pair of auxiliary tapes spaced from the first end and the second end of the main tape, the pair of auxiliary tapes cover the pair of side surfaces,
wherein a height of the pair of side surfaces is less than a width of the top surface between the pair of side surfaces,
wherein the main tape is integrally attached to the pair of side surfaces, the upper surface and the lower surface of the battery case; and
wherein the pair of auxiliary tapes are attached to the main tape and arranged to face the upper surface and the lower surface of the battery case with the main tape being interposed therebetween when the main tape is attached to the battery case.

2. The battery cell according to claim 1, wherein a wing folding portion that is folded at least once is provided to the upper surface and the lower surface of the battery case, and the tape is attached to the wing folding portion.

3. The battery cell according to claim 1, wherein the tape is attached to at least one surface among the pair of side surfaces, the upper surface and the lower surface of the battery case and then attached to the pair of side surfaces, the upper surface and the lower surface of the battery case by rotating at least one of the battery case and the tape.

4. The battery cell according to claim 1, wherein the main tape is a double-sided tape.

5. The battery cell according to claim 1, wherein the pair of auxiliary tapes are insulating tapes.

6. A battery module, comprising:
a plurality of battery cells as defined in claim 1; and
a module case configured to accommodate the plurality of battery cells.

7. The battery module according to claim 6, wherein the plurality of battery cells are stacked on each other such that the pair of side surfaces of the battery cells face each other inside the module case, and
wherein, when the plurality of battery cells are stacked, the tape of a first battery cell is adhered to the tape of a second battery cell so that the plurality of battery cells are fixed to each other inside the module case.

8. A battery rack, comprising:
at least one battery module as defined in claim 6; and
a rack case configured to accommodate the at least one battery module.

9. An energy storage system, comprising:
at least one battery rack as defined in claim 8.

10. The battery cell according to claim 1,
wherein the first end and second end of the tape are on a same surface of the battery cell.

11. The battery cell according to claim 1, wherein the main tape has a length between the first end and the second end and a width perpendicular to the length, and
wherein the width of the main tape is less than a width of the battery cell.

12. The battery cell according to claim 11, wherein a width of each of the pair of auxiliary tapes is equal to the width of the main tape.

13. The battery cell according to claim 11, wherein the main tape attaches to the pair of side surfaces, the upper surface and the lower surface of the battery case in a winding direction, and
wherein a length of each of the pair of auxiliary tapes in the winding direction is greater than the height of the pair of side surfaces.

* * * * *